(No Model.)

2 Sheets—Sheet 1.

G. WIARD.
SULKY PLOW.

No. 278,643. Patented May 29, 1883.

Witnesses.
Edw. J. Brady.
Theo. L. Popp.

George Wiard Inventor.
By Wilhelm Bonner
Attorneys.

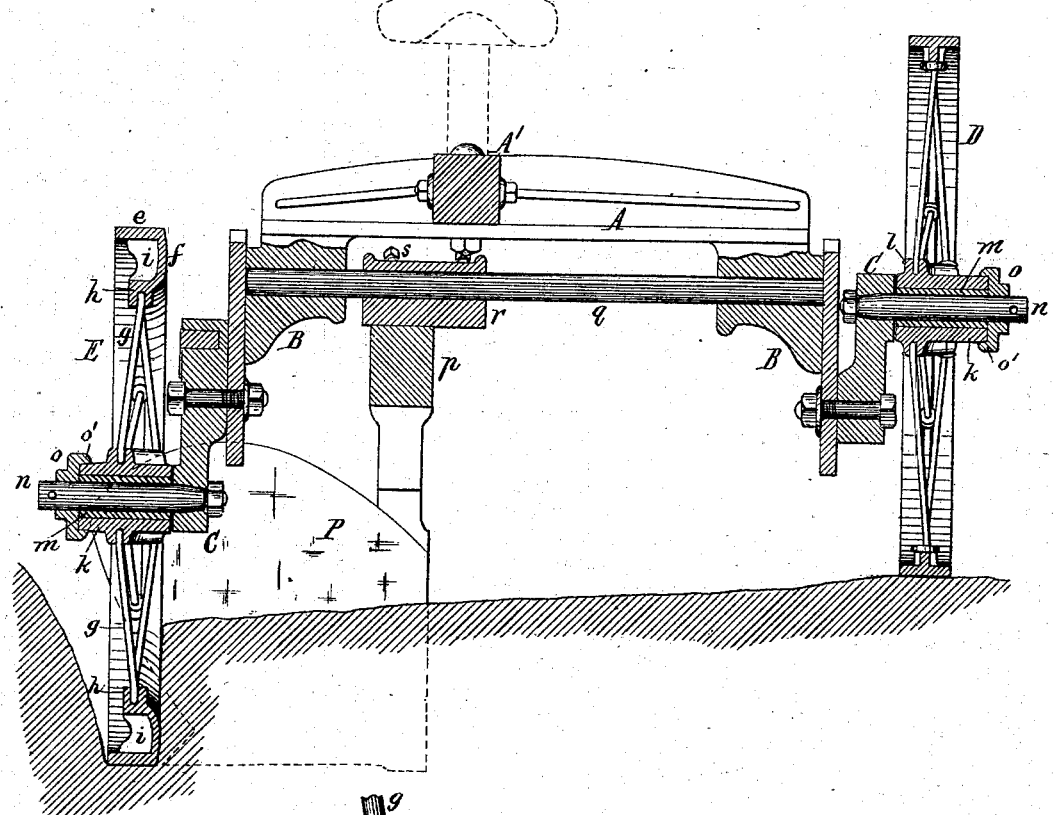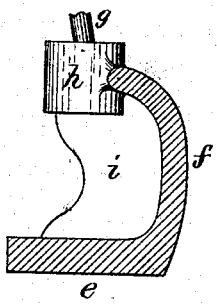

United States Patent Office.

GEORGE WIARD, OF BATAVIA, NEW YORK, ASSIGNOR TO THE WIARD PLOW COMPANY, OF SAME PLACE.

SULKY-PLOW.

SPECIFICATION forming part of Letters Patent No. 278,643, dated May 29, 1883.

Application filed January 25, 1883. (No model.)

*To all whom it may concern:*

Be it known that I, GEORGE WIARD, of Batavia, in the county of Genesee and State of New York, have invented new and useful Improvements in Sulky-Plows, of which the following is a specification.

This invention relates to certain improvements in that class of sulky-plows in which the wheel adjacent to the plowshare is caused to run in the furrow, and has for its object to render the movement of the plow steady and uniform.

My invention consists to that end of the improved construction of the rim of the wheel which runs in the furrow, whereby the wheel is prevented from rising from the furrow upon the land, and whereby the wheel is better enabled to resist the lateral pressure of the plow; also, of a novel construction of the devices whereby the plow-beam is laterally adjusted on the sulky-frame to regulate its position with reference to the wheel which travels in the furrow; also, of an improved construction of the hub of the wheel, whereby the wear of the metallic parts is reduced and dirt excluded from the bearing, as will be hereinafter fully set forth, and pointed out in the claims.

Figure 1:
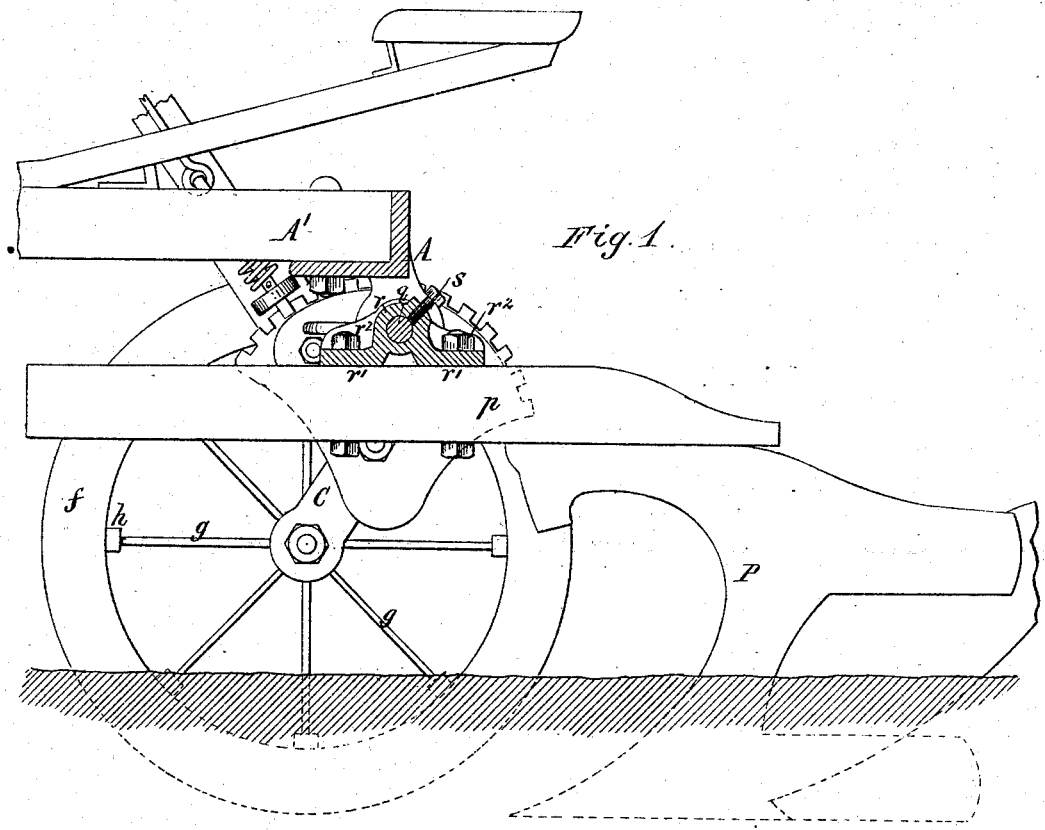
Figure 2:
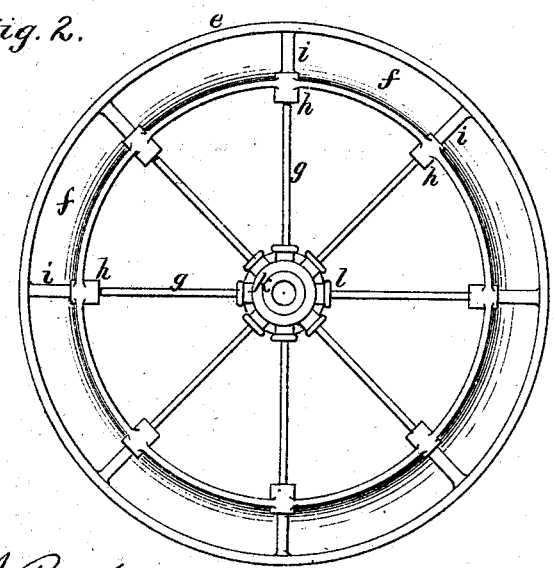
Figure 3:
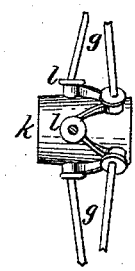

In the accompanying drawings, consisting of two sheets, Figure 1 is a longitudinal sectional elevation of a sulky-plow provided with my improvements. Fig. 2 is an outside elevation of the wheel which runs in the furrow. Fig. 3 is an elevation of the hub of the wheel. Fig. 4 is a cross-section of the machine. Fig. 5 is a cross-section on an enlarged scale of the rim of the wheel which runs in the furrow.

Like letters of reference refer to like parts in the several figures.

A represents the cross-piece secured to the rear end of the frame A' of the machine, and B B two brackets depending from the ends of the cross-piece A and carrying the adjustable wheel-supports C C, which may be of any suitable and well-known construction.

D represents the wheel which runs on the land, and E the wheel which runs in the furrow. The rim of the wheel E is composed of a peripheral flange or tire, e, upon which the wheel runs, and an annular flange, f, projecting inwardly from the tire e and arranged on the inner or land side of the wheel, so as to run in contact with the upright side of the furrow, as clearly represented in Fig. 4. The outer portion of the radial flange f is arranged at an angle to the tire e, so that that portion of the flange f which is adjacent to the tire e inclines outwardly or away from the land, as clearly shown in Fig. 5, whereby the wheel receives a tendency to work away from the land. This prevents the wheel from mounting the land under the lateral pressure of the plow, which tends to draw the wheel inwardly. The radial flange f resists the inward pressure of the plow in the absence of the above-described inclined position, and by the enlarged bearing-surface which it affords prevents to a certain extent the wheel from running toward the land under the lateral pressure of the plow.

g represents the spokes of the wheels, which are preferably constructed of wrought-iron and cast into the rims and hubs of the wheels. The rim of the wheel E is provided with lugs h, cast on the annular flange f and connected with the peripheral flange e by ribs i. The lugs h receive the outer ends of the spokes g.

k represents the hubs of the wheels D and E, both constructed of cast-iron, and provided with lugs l, which receive the inner ends of the spokes g.

m represents a removable cylindrical axle-box, constructed of wood and secured in the hub k by set-screws. The axle-boxes m turn on the journals n, which are secured to the supporting-arms C C.

o represents a cap which is applied to the outer portion of the journal n, and which bears against the outer ends of the axle-box m and hub k, and which is provided with a marginal flange, o', which overlaps the edge of the hub k. The cap o is held in place by a pin or split key passed through the journal, or by other suitable and well-known means. The wood of which the axle-box is constructed is much softer than the metallic journal on which it turns; hence the wear will fall mostly on the axle-box, which can be readily replaced by a new one when worn out. The wheel is of course not affected by the wear of the bearing-surfaces, while the journal is but slightly affected. These parts remain, therefore, in a serviceable condition for a long time, and by renewing the axle-box as often as may be necessary the parts are kept in working order at a very small cost. The cap o protects the outer end of the hub and axle-box and excludes the dirt therefrom.

P represents the plowshare, and p the plow-beam to which it is secured. q represents a transverse rod or bar, which is supported with its ends in the brackets B B; and r is a bearing which is mounted on the bar q, so as to be laterally adjustable thereon. The bearing r is constructed with a flange or base, r', which is secured by bolts r² to the upper side of the plow-beam p, and whereby the latter is adjustably connected with the rod q. The bearing is held on the rod q in any desired position by set-screws s. Upon releasing the latter the bearing r and the plow attached thereto can be adjusted laterally toward or from the wheel E, so as to regulate the relative position of the plow and the wheel which runs in the furrow, to adapt the position of the wheel to the width of the furrow which it is desired to turn.

I claim as my invention—

1. In a sulky-plow, a wheel, E, constructed with a peripheral flange or tire, e, on which the wheel runs, and an annular flange, f, projecting inwardly from the flange e, and arranged on the inner or land side of the wheel, whereby the wheel is enabled to resist the lateral pressure of the plow, substantially as set forth.

2. In a sulky-plow, a wheel, E, constructed with a peripheral flange or tire, e, on which the wheel runs, and an annular flange, f, arranged on the inner or land side of the wheel in an inclined position, whereby the wheel receives a tendency to work away from the land and is prevented from mounting the land, substantially as set forth.

GEORGE WIARD.

Witnesses:
I. I. WASHBURN,
I. E. MECORNEY.